United States Patent
Wolff et al.

(10) Patent No.: US 7,357,443 B2
(45) Date of Patent: Apr. 15, 2008

(54) DEFORMABLE COMPONENT, ESPECIALLY ACCESSORY FOR A VEHICLE, AND PROCESS FOR MANUFACTURING

(75) Inventors: Martin Wolff, Hattingen (DE); Birgit Budde, Remscheid (DE); Otwald Bruns, Wuppertal (DE); Hubert Brueckner, Erkrath (DE)

(73) Assignee: Johnson Controls GmbH, Burscheid (DE)

( * ) Notice: Subject to any disclaimer, the term of this patent is extended or adjusted under 35 U.S.C. 154(b) by 184 days.

(21) Appl. No.: 10/507,981

(22) PCT Filed: Mar. 14, 2003

(86) PCT No.: PCT/EP03/02695

§ 371 (c)(1),
(2), (4) Date: Mar. 23, 2005

(87) PCT Pub. No.: WO03/078149

PCT Pub. Date: Sep. 25, 2003

(65) Prior Publication Data
US 2005/0168003 A1 Aug. 4, 2005

(30) Foreign Application Priority Data
Mar. 15, 2002 (DE) ................. 102 11 656

(51) Int. Cl.
*B29D 12/00* (2006.01)

(52) U.S. Cl. .................. 296/187.01; 296/37.8; 297/411.2

(58) Field of Classification Search ............ 296/37.8, 296/191, 70, 187.02, 187.05, 39.1, 39.3, 296/1.02, 72, 73, 1.09, 1.08, 214, 24.3; 297/214, 297/411.2, 411.21, 411.26, 411.45
See application file for complete search history.

(56) References Cited

U.S. PATENT DOCUMENTS

| 5,244,251 | A | 9/1993 | Bourla |
| 5,348,369 | A | 9/1994 | Yu |
| 6,343,839 | B1 | 2/2002 | Simons, Jr. et al. |
| 7,201,434 | B1* | 4/2007 | Michalak et al. ...... 296/187.05 |

FOREIGN PATENT DOCUMENTS

| DE | 24 34 768 A1 | 2/1976 |
| DE | 197 52 786 A1 | 6/1998 |

OTHER PUBLICATIONS

International Search Report; International Application No. PCT/EP03/02695 dated Feb. 7, 2003 (2 pages).
International Preliminary Examination Report for International Application No. PCT/EP2003/002695, (German).
International Preliminary Examination Report for International Application No. PCT/EP2003/002695.

* cited by examiner

*Primary Examiner*—Joseph D Pape
(74) *Attorney, Agent, or Firm*—Foley and Lardner LLP

(57) ABSTRACT

A structural article, in particular an equipment article for the interior of a motor vehicle, includes a first, hard-elastic or plastically deformable carrier structure (2) and of a second, soft-elastic component (6) which is connected in one piece to the latter and which sealingly closes the carrier structure provided with recesses (5). There is provision for the recesses (5) to be essentially filled by the soft-elastic component (6) and consequently to be sealingly closed. A method for producing a structural article of this type is also disclosed.

10 Claims, 2 Drawing Sheets

Section A-A

Section B-B
View X

View X

DEFORMABLE COMPONENT, ESPECIALLY ACCESSORY FOR A VEHICLE, AND PROCESS FOR MANUFACTURING

CROSS REFERENCE TO RELATED APPLICATIONS

The present application claims the benefit of priority to the following international applications: PCT Patent Application No. PCT/EP03/02695 titled "Trim article, in particular for a motor vehicle, and method producing it" filed on Mar. 14, 2003 which published under PCT Article 21(2) on Sep. 25, 2003 as WO 03/078149 A1 in the German language and German Patent Application No. 10211656.3 filed on Mar. 15, 2002 (which are hereby incorporated herein by reference in their entirety).

BACKGROUND

The invention relates to a structural article, in particular an equipment article for the interior of a motor vehicle, consisting of a first, hard-elastic or plastically deformable carrier structure and of a second, soft-elastic component which is connected in one piece to the latter and which sealingly closes the carrier structure provided with recesses, and to a method for producing a structural article of this type, in which the hard-elastic or plastically deformable carrier structure provided with recesses and the soft-elastic component are preferably formed by injection molding.

The laid-open publication DE 197 52 786 A1 discloses a generic structural article and method. The structural article, designed as a storage compartment for a motor vehicle, consists of a trough-like inner part made from a soft plastic, for example from a thermoplastic elastomer, which is surrounded by a hard outer shell connected in a materially integral manner to the inner part. The outer shell has introduced into it U-shaped recesses which form hard-elastically resilient latching tongues provided with latching projections. From the inside of the storage compartment, the recesses are concealed completely by the trough-like inner part. A flexural deformation of the latching tongue causes a bulging of the inner part which, through the use of a soft-elastic material, does not result in any mechanical damage.

In the production of a structural article of this type, in the injection mold, first the inner part is formed onto a mold core in a cavity reduced in size, as compared with the desired contour, by the amount of the wall thickness of the hard component. Subsequently, the mold core, together with the soft inner part formed on it, is inserted into the mold nest of an enlarged casting mold. With the die closed, the gap remaining between the inner part and the mold nest can then be filled with the hard plastic.

This procedure has the fundamental disadvantage that a considerable amount of material has to be used for the comparatively costly soft component. It is therefore suitable only for structural articles in which the inner shell is to be lined over its entire area with a soft trough in order to improve handling.

The same document describes an already known method in which a storage compartment of this type is manufactured by the injection molding of the outer hard trough. After the mold core has been extracted, another mold core of smaller cross section is introduced into the trough interior, and the gap which occurs is filled with the soft component. In this case, in the applicant's opinion, it is absolutely necessary to prevent soft plastic material from running into exposed latching contours of the hard shell.

The object on which the invention is based is to provide a sealed structural article with deformable carrier structures, which structural article can be manufactured with a relatively small fraction of soft-elastic material component by means of a simple method having high process reliability.

SUMMARY

The object is achieved, according to the invention, in that the recesses of the structural article are essentially filled by the soft-elastic component and are consequently sealingly closed.

According to a preferred embodiment, the hard-elastic carrier structure may in this case have U-shaped recesses which form latching tongues integrally formed into the carrier structure and which serve, for example, for the releasable fastening of the structural article in an overall system. In this case, the local wall thickness of the soft-elastic component sealingly filling the recess is designed to be preferably smaller, in particular lower by at least half, than the local width of the respective recess. In this way, the soft-elastic filling of the recess is sufficiently deformable, so that the bulgings necessary for inserting the latching tongues can be carried out without any damage and with little effort.

According to another preferred embodiment of the invention, the hard-elastic or plastically deformable carrier structure is of grid-like design, the sheet-like recesses formed between the grid elements being essentially filled by the soft-elastic component and consequently being sealingly closed. Although a structural article of this type has sufficient basic rigidity, it may nevertheless experience plastic deformation in the event of a lateral impact, without an undesirably high deformation force having to be applied.

Furthermore, the sealing closure brought about by the soft-elastic component makes it possible to apply a foam layer, in particular consisting of a PUR foam, which covers on one side the hard-elastic or plastically deformable carrier structure and the soft-elastic fraction sealingly filling the recesses, without special measures for closing the recesses during the foaming operation having to be carried out during manufacture. In this special case, however, it may be appropriate, as in the prior art referred to, to cover the carrier structure on the inside or outside with the soft-elastic component completely or at least in the region of the recesses for sealing-off purposes. According to a further design of the invention, there may in this case advantageously be provision for the foam layer to be surrounded over the entire circumference, on its lateral bearing face confronting the carrier structure, by a sealing bead consisting of soft-elastic material and integrally formed in one piece onto the carrier structure. The sealing bead seals off the carrier structure laterally in the foaming die, so that the foam cannot escape from the die cavity.

The foam may additionally be coated outwardly with a sheet-like decorative material, in particular a plastic film, a fabric or a leather.

The method according to the invention for producing the structural article is characterized in that the recesses are subsequently sealingly filled by the injection of a soft-elastic component.

According to a particular development of the method, in this case, at the same time as the injection of the soft-elastic component into the recesses or offset in time with respect to this operation, a preferably peripheral sealing bead consisting of soft-elastic component is integrally formed on the carrier structure. Subsequently, the carrier structure can be introduced into a foaming die and be provided at least on one side with a foam layer. In a further method step, there may be provision, before foaming, for a sheet-like decorative material to be introduced into the foaming die and, subsequently, for the foam layer to be introduced into the space between the decorative material and the carrier structure. Alternatively, after the foaming process, a sheet-like decorative material may be coated, in particular glued, onto the foam layer.

BRIEF DESCRIPTION OF THE FIGURES

The figures illustrate an embodiment of the invention by way of example and diagrammatically.

DESCRIPTION OF THE PREFERRED AND EXEMPLARY EMBODIMENTS

The armrest 1 illustrated in the figures consists of a hard-elastic or plastically deformable carrier structure 2 which can be produced, for example, from a polypropylene (PP) or a PP compound by injection molding. The armrest may be connected releasably to a middle console 4, merely indicated in FIG. 2, via a latching connection 3.

Figure 1:
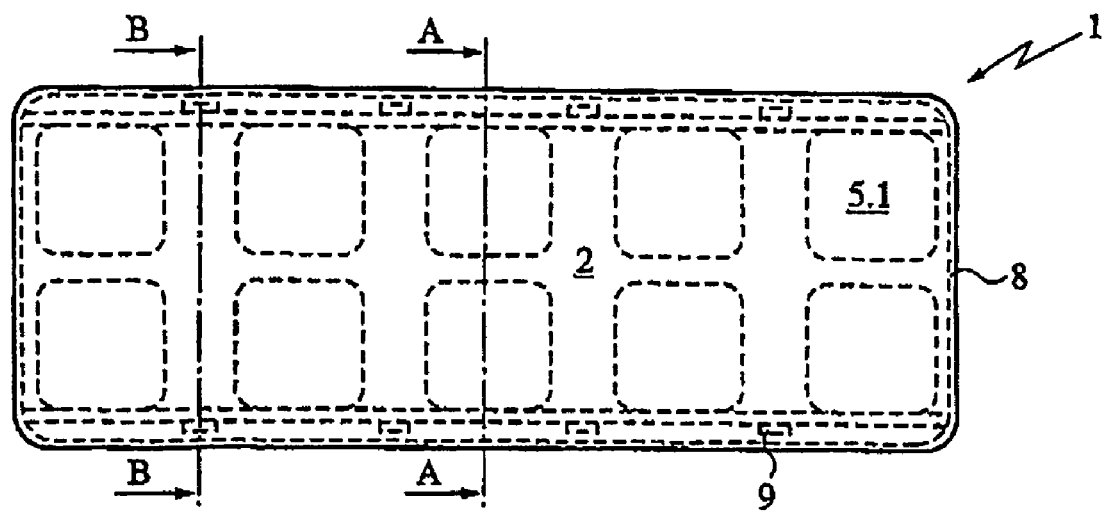
FIG. 1 shows an elevation view of an armrest configured according to the invention for a middle console.

As is evident from FIG. 1, the carrier structure 2 is of grid-like design, so that, although it has basically a sufficient strength for use, it is nevertheless elastically or plastically deformable in the event of an accident-induced lateral load, for example the impact of a seat occupant positioned next to the middle console. The local forces acting on the seat occupant can, by virtue of this design, be reduced considerably, as compared with a carrier structure closed over its entire area.

Figure 2:
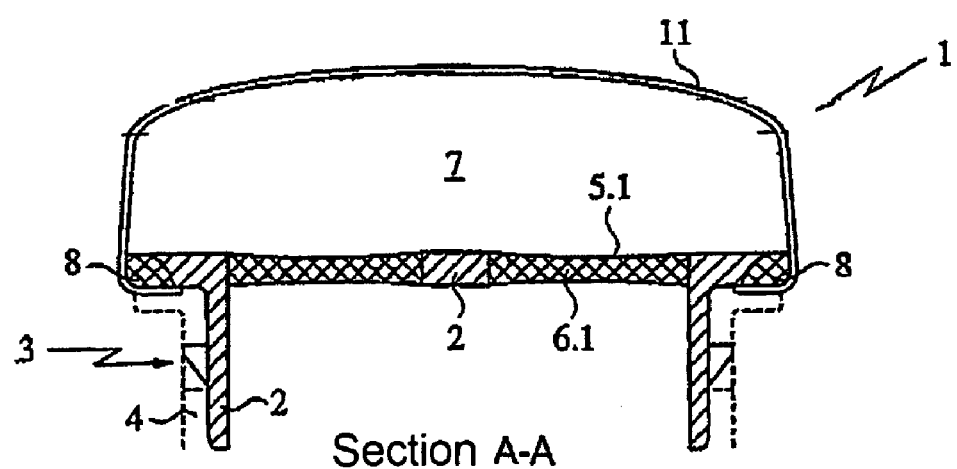
FIG. 2 shows the armrest according to FIG. 1 in the section A-A.

As shown in FIG. 2, the recesses 5.1 occurring in the case of the grid-like design of the carrier structure are sealingly closed by means of a membrane-like soft-elastic component 6.1. It is therefore possible, without any further assistance, to introduce the sealed carrier structure 2 into a foaming die and upholster it comfortably on the resting side of the arm of the seat occupant by the foaming on of a foam cushion 7 consisting, for example, of a PUR foam. The foam cushion 7 is coated on the resting side with a decoration 11 consisting, for example, of leather, of a plastic film or of a sheet-like textile structure.

The material considered for the soft-elastic component is, for example, a polyolefinic thermoplastic elastomer (TPE-O) having a Shore A hardness of 60 to 80. This material can easily be connected to a carrier structure manufactured from PP, increases the rigidity of the latter only slightly and has a sufficient strength to withstand the foaming pressure when the foam cushion 7 is foamed on.

Furthermore, together with the membrane-like soft-elastic component 6.1, a sealing bead 8 surrounding the carrier structure laterally over the entire circumference is injected on from the same material, said sealing bead sealing off the carrier structure 2 in the foaming die and preventing an overflow of the foam. In this case, of course, care must be taken to ensure that the air to be displaced out of the cavity by the expanding foam can be discharged.

Figure 3:
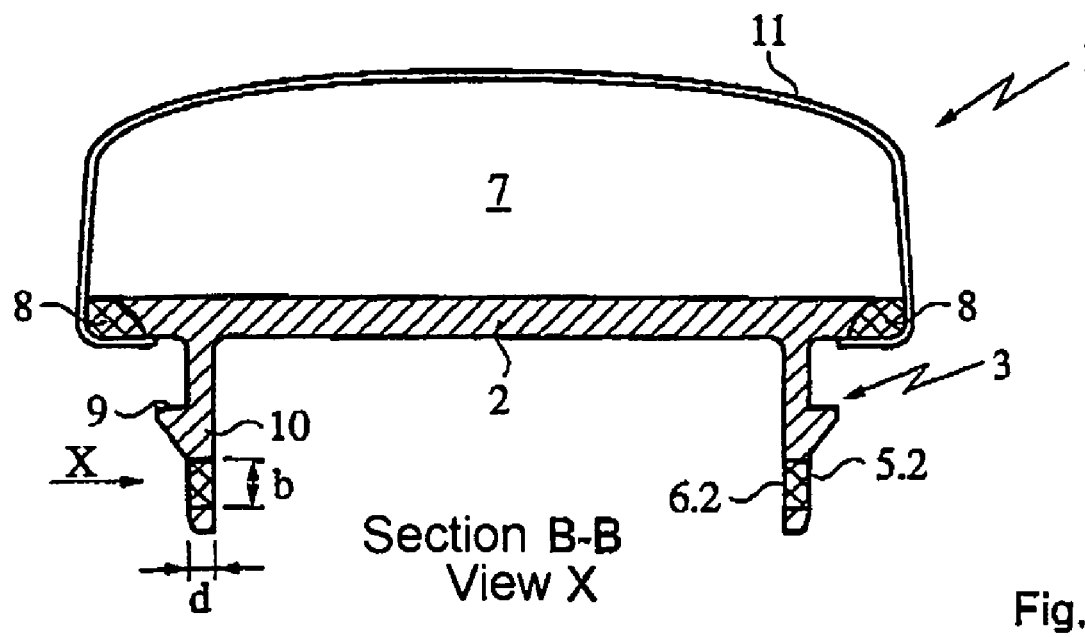
FIG. 3 shows the armrest according to FIG. 1 in the section B-B.
Figure 4:
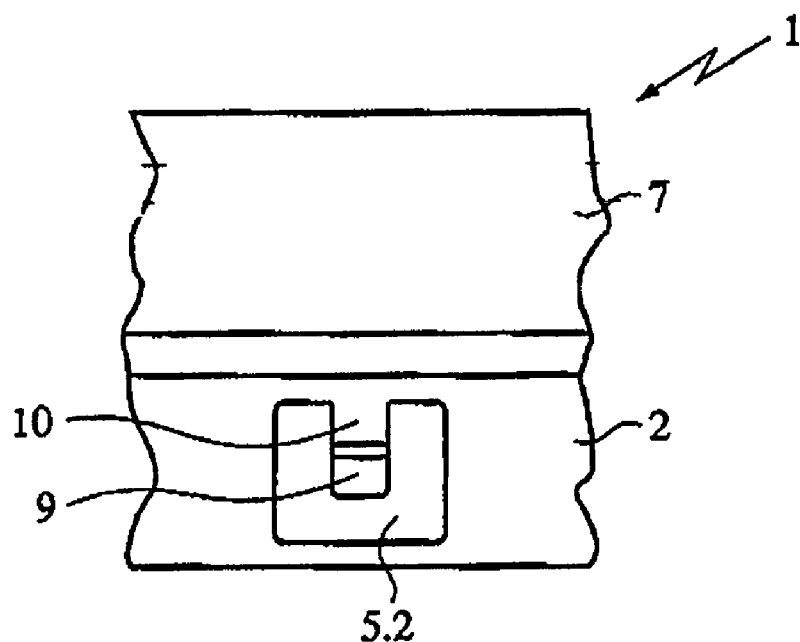
FIG. 4 shows a detail of a side view of the armrest according to FIG. 3 from the direction X.

As is evident from FIGS. 3 and 4, the carrier structure 2 is provided, furthermore, with a number of U-shaped recesses 5.2 which form latching tongues 10 provided with latching hooks 9 in the region of the latching connections 3. The latching tongues 10, although being connected in one piece to the carrier structure 2, are comparatively soft in flexural terms on account of their geometric design, so that the armrest 1 can be latched in the middle console 4 with little effort.

For visual reasons, the recesses 5.2 are likewise closed by means of a soft-elastic component 6.2 which is preferably injected on in one operation, together with the remaining soft fractions, from the same material. In this case, to reduce the deformation resistance, the wall thickness d of the soft-elastic component is dimensioned such that it is smaller than the width b of the recess 5.2. In the exemplary embodiment, the wall thickness d amounts to about half the width b, so that the flexibility of the tongue 10 is not inadmissibly diminished due to the tie-up of the soft-elastic component.

REFERENCE SYMBOLS

1 Armrest
2 Carrier structure
3 Latching connection
4 Middle console
5 Recess
6 Soft-elastic component
7 Foam cushion
8 Sealing bead
9 Latching hook
10 Latching tongue
11 Decoration

The invention claimed is:

1. A structural article for use in a vehicle comprising:
   a carrier member having grid elements defining a plurality of recesses providing a grid-like design;
   an elastic component coupled to the carrier member and configured to sealingly engage the plurality of recesses in the carrier member.

2. The structural article of claim 1 wherein that the local wall thickness of the elastic component is smaller than the local width of the respective recess.

3. The structural article of claim 1 wherein that the local wall thickness of the elastic component is at most half as large as the local width of the respective recess.

4. The structural article of claim 1 further comprising a foam layer formed on one side the carrier member and the elastic component.

5. The structural article of claim 4 wherein the foam layer is surrounded over its entire circumference by a sealing bead comprising a soft-elastic material formed onto the carrier member.

6. The structural article of claim 1 wherein the carrier member is made of at least one of a hard-elastic material or a plastically deformable material.

7. A structural article for use in a vehicle comprising:
   a carrier member having at least one recess;
   an elastic component coupled to the carrier member and configured to sealingly engage the at least one recess in the carrier member;

a foam layer that covers one side the carrier member and the elastic component;

wherein the foam layer is surrounded over its entire circumference by a sealing bead of a soft-elastic material and integrally formed in one piece onto the carrier member.

8. The structural article of claim 7 wherein the at least one recess comprises a plurality of U-shaped recesses that form latching tongues integrally formed into the carrier member.

9. The structural article of claim 7 wherein the at least one recess comprises a plurality of recesses disposed in a grid-like design and defined by grid elements on the carrier member.

10. The structural article of claim 7 wherein the foam layer comprises an outer sheet.

* * * * *